United States Patent [19]

Alexander

[11] 4,399,763
[45] Aug. 23, 1983

[54] METHOD OF MAKING DUAL-PLY PLANT BED COVER

[76] Inventor: Marvin C. Alexander, 11th and Sycamore Sts., Weldon, N.C. 27890

[21] Appl. No.: 263,585

[22] Filed: May 14, 1981

Related U.S. Application Data

[63] Continuation-in-part of Ser. No. 101,756, Dec. 10, 1979, abandoned.

[51] Int. Cl.$^3$ .............................................. D05B 97/00
[52] U.S. Cl. .................................. 112/262.3; 112/130; 112/152; 112/305; 112/307
[58] Field of Search .................. 112/262.1, 262.3, 303, 112/305, 307, 130, 131, 152, 121.26, 121.27, 440, 441

[56] References Cited

U.S. PATENT DOCUMENTS

| | | | |
|---|---|---|---|
| 3,270,696 | 9/1966 | Lowenstein | 112/262.3 |
| 3,395,658 | 8/1968 | Lee et al. | 112/262.3 X |
| 3,973,506 | 8/1976 | Rinehimer et al. | 112/262.3 X |
| 4,269,130 | 5/1981 | Burton et al. | 112/262.3 |
| 4,287,841 | 9/1981 | Rovin | 112/307 X |

Primary Examiner—H. Hampton Hunter
Attorney, Agent, or Firm—Mills and Coats

[57] ABSTRACT

The present invention relates to a dual-ply fumigation and plant bed cover including an imperforated plastic type cover that acts to effectively seal a plant bed during fumigation and a cloth type cover for providing basic plant protection during the early growth of plants within the covered plant bed. The plastic type cover is stitched to the cloth type cover about a tear seam in order that at a selected time the plastic type cover can be torn or stripped away from the cloth type cover, leaving the cloth type cover stretched over the plant bed. To form the tear seam, a tape cloth strip is secured over the plastic layer about each side, and stitches are sewn through the tape cloth, plastic, and cloth layers. As a part of the method of the present invention, as disclosed herein, after seeding, the plastic type cover may remain intact with said cloth type cover until seed germination, so as to effectively expedite seed germination because of a greenhouse effect realized by the plastic type cover.

4 Claims, 3 Drawing Figures

METHOD OF MAKING DUAL-PLY PLANT BED COVER

The present application is a continuation-in-part of U.S. patent application Ser. No. 101,756, filed Dec. 10, 1979, and entitled "DUAL-PLY FUMIGATION AND PLANT BED COVER AND METHOD OF PREPARING AND COVERING PLANT BEDS", now abandoned.

FIELD OF INVENTION

The present invention relates to covering devices and more particularly to covering devices for plant beds. Still more particularly the present invention relates to a two-play plant bed covering device that is adapted to be utilized during fumigation and during early plant growth, and a method of forming and fabricating the same.

BACKGROUND OF INVENTION

Numerous agricultural crops such as tobacco and tomatoes are started in plant beds. Typically, the plant bed is seeded, and after the plants have reached plant maturity, they are pulled from the plant bed and transplanted in the field.

Preparing and managing a plant bed is often a very time consuming and laborious job. First, the plant bed must be fumigated, after which the bed is aerated, disced, fertilized, and finally seeded. It is conventional to provide a fumigation cover for the plant bed during fumigation. This effectively seals the plant bed and maintains the fumigant gases in and around the plant bed area. After fumigation is concluded, the fumigant cover must be removed from the plant bed. Once the plant bed has been seeded and after the seeds have germinated, it is conventional to apply a plant bed cover over the plant bed in order to protect the plants during the early stages of growth. All in all, the time and effort of covering and uncovering the plant bed with the fumigant cover and plant bed cover is very substantial, not to mention the difficulties and incovenience involved.

With labor continuing to be scarce and expensive, there continues to be a real need to reduce the labor required in plant bed operations and to, where possible, reduce cost associated therewith. In view of this, it is clear that labor could be saved and the general convenience of dealing with plant bed operations would be improved if it was possible to provide one single plant bed cover that would accomplish both the function required of a fumigant cover and the function required of a conventional plant bed cover.

SUMMARY OF THE INVENTION

The present invention presents a dual-ply plant bed cover that is designed to be utilized by the farmer or plant bed operator as both a plant bed cover and as a fumigant cover. This is accomplished by providing a two-ply cover ensemble or assembly that comprises a first cloth-like cover that when stretched across the plant bed assumes the lower position of the two-ply cover and lies directly adjacent the plant bed. Stitched to the outer boundaries or other selected areas of the coth type cover is an upper plastic cover that serves to contain and hold the fumigant gases in and around the plant bed during fumigation.

In the preferred embodiment disclosed herein, the plastic type fumigant cover is stitched to the lower ply cloth type cover to form a stitched seam about the two-ply cover that enables the plastic cover to be easily torn apart and separated from the cloth type cover along the stitched seams. Generally, the upper ply fumigant plastic cover would be separated and torn from the cloth type cover after seed germination-just about the time the plants tend to emerge from the upper crust of the ground.

In this regard, it is appreciated that once the seeding of the plant bed is accomplished, the entire two-ply cover could be stretched over the plant bed in such a fashion that the upper plastic type fumigant cover would serve a greenhouse type function to hold and retain heat underneath the two-ply cover assembly. Effectively this would expedite speed germination and ultimately this would reduce the time required to produce mature plants.

Also, the present invention entails a novel and unique method or process for manufacturing and fabricating the dual-ply fumigation and plant bed cover of the present invention. As will become appreciated from subsequent portions of this disclosure, this method entails a very efficient and relatively high speed process for fabricating the dual-ply plant bed cover of the present invention in such a manner that the plant bed cover functions in the manner intended. In this regard, a plastic like sheet is pulled from a plastic roll simultaneously with the pulling of a cloth type sheet from a cloth roll. The two sheets are directed together in close back-to-back relationship and pulled or driven simultaneously together with each sheet traveling the same speed. The two sheets are directed over an idler and each sheet, about both opposite sides, are directed through conventional air actuated centering means for maintaining both the plastic and cloth type layers in proper alignment with respect to each other. As the two sheets or layers are directed through the process, a tape cloth is dispensed into the top plastic layer about each side thereof. The plastic layer, cloth type layer, and tape cloth strips are then directed through a dual head stitching system. Each side of the plastic and cloth type layers along with an overlying tape cloth strip is aligned and directed through a respective stitching head. The stitching head sews a stitched thread through the upper tape cloth strip and on through the plastic and cloth like layers so as to form a securing seam about each side of the formed cover so as to integrally secure the plastic and cloth type covers together. After this fabrication procedure, the formed dual-ply plant bed cover is cut into selected lengths and packaged.

It is, therefore, an object of the present invention to provide a multi-ply agricultural cover ensemble that is adapted to be utilized in conjunction with plant beds during both the fumigation phase and the early plant growth phase, thereby providing one single cover that will serve all plant bed operation requirements.

Still a further object of the present invention resides in the provision of a dual-ply plant bed cover that is provided with a first cloth like cover that assumes a lower position directly adjacent the plant bed, and further including a separable plastic type fumigant cover that generally occupies the upper ply or upper position when the dual-ply plant bed cover is in operation and which generally assures that the fumigant gases are maintained about the plant bed area during fumigation.

It is a further object of the present invention to provide a dual ply fumigant and plant bed cover of the basic character referred to above wherein the same is designed to be compatible with a total plant bed operation and more particularly wherein the upper disposed plastic type fumigant cover is designed to be easily separated and torn from the lower cloth type cover without damaging or harming the lower type cover.

Still a further object of the present invention resides in the provision of a dual-ply fumigation and plant bed cover and a method of covering a plant bed from fumigation through plant growth wherein after fumigation and seeding, the fumigant plastic cover is maintained on the plant bed until the seeds germinate thereby giving a greenhouse effect to the plant bed and generally expediting seed germination.

Finally, it is an object of the present invention to provide a multi-ply fumigation and plant bed cover of the character described above wherein the top plastic type cover is secured to the lower cloth like cover by a stitched seam, and wherein the upper plastic type cover can be easily separated and/or torn away from the cloth type cover while the entire cover assembly is stretched and supported about a plant bed.

Another object of the present invention is to provide a practical and efficient process for fabricating the dual-ply fumigation and plant bed cover of the present invention.

Still a further object of the present invention resides in the provision of a method or process for producing the dual-ply fumigation and plant bed cover wherein the material forming the same moves through the process at a relatively fast speed without significant hindrances and break-downs.

It is a further object of the present invention to provide a method or process of the character discussed hereinabove of the single run type wherein all fabrications and treatments are made in the material through a single run through the process, thereby not requiring additional space and time for duplicating runs to complete the fabrication of the dual-ply plant bed cover of the present invention.

In addition, an object of the present invention entails the provision of a method or process for producing the dual-ply fumigation and plant bed cover of the present invention wherein the method of fabrication includes the step of stitching the plastic layer to the cloth type layer in such a manner that the plastic type layer can be cleanly and neatly torn from the cloth type layer without damaging, destroying, or otherwise impairing the cloth type cover.

Another object of the present invention resides in the provision of a continuous method of manufacturing the dual-ply fumigation and plant bed cover of the present invention wherein the method or process is designed such that one segment of the production process can be stopped for cutting into selected lengths, while the preceding stitching and fabricating segment can be continuously ran.

A further object of the present invention resides in the provision of a method for manufacturing and fabricating the dual-ply fumigation and plant bed cover of the present invention including a take-up segment incorporated between the stitching and cutting steps for continuously taking up fabricated cover being continuously ran through the process while the fabricated cover just preceding the cutting device is halted.

A further object of the present invention resides in a method or process for fabricating the dual-ply fumigation and plant bed cover of the present invention including powered roller means strategically placed within the fabrication network for engaging and pulling the tape cloth strips, plastic cover, and cloth type cover simultaneously through the respective stations of the process in a smooth and orderly fashion without jerking and/or tearing the material forming the final fabricated cover.

Other objects and advantages of the present invention will become apparent from a study of the following description and the accompanying drawings which are merely illustrative of the present invention

Figure 1:
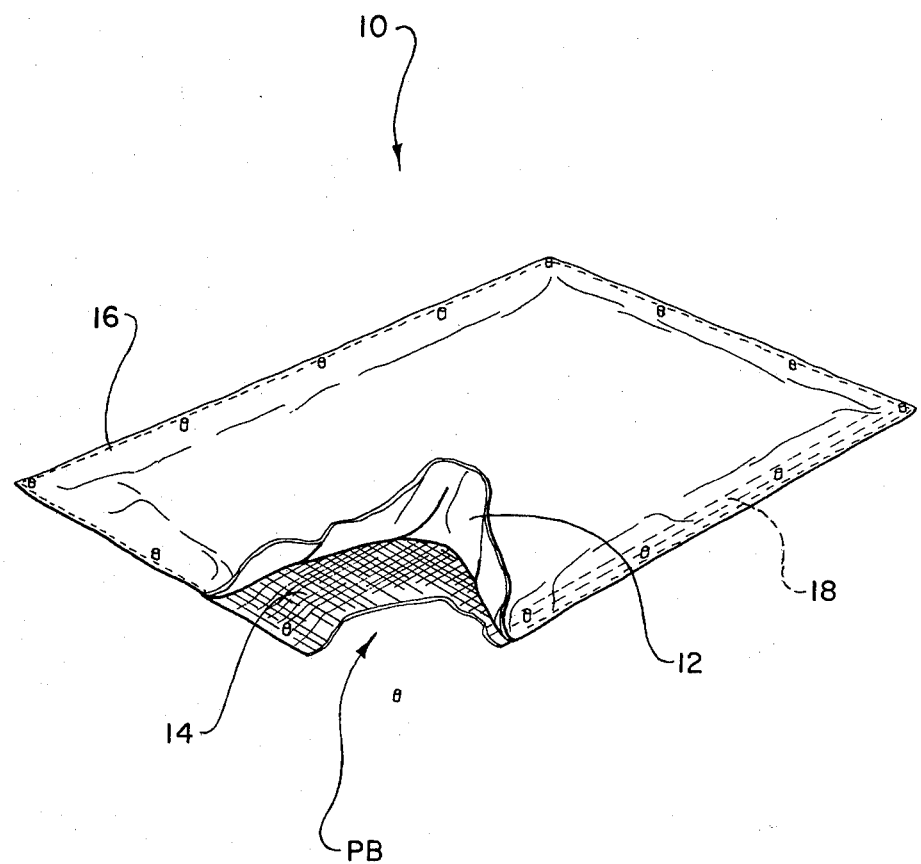
FIG. 1 is a perspective view of the dual-ply fumigation and plant bed cover, with the cover being stretched across a plant bed.

COMBINATION FUMIGATION AND PLANT BED COVER AND METHOD OF PREPARING AND MANAGING A PLANT BED

With further reference to the drawings, the combination fumigation and plant bed cover is shown therein and indicated generally by the numeral 10. Viewing the same in more detail, the fumigation and plant bed cover 10 is of a generally two-ply structure inasmuch as the same first includes a cloth type cover 14 and a plastic type cover 12 that are disposed one atop the other and wherein the top plastic cover 12 is stitched to the cloth type cover 14 by a stitched seam connection 16 that in a preferred embodiment would be stitched around the outer boundary area of the cloth type cover 14. The stitch seam connection 16 is particularly provided such that the perforations created by the stitched seam allow the top plastic type cover 12 to be easily torn or separated from the cloth type cover 14 without damaging the cloth type cover. The significance of this will become more apparent from subsequent portions of this disclosure.

In a preferred embodiment of the present invention, the coth type layer or cover 14 would be comprised of an anti-rot, spun bonded polyester. Cloth type cover 14 is particularly designed as a plant bed cover and more particularly to cover and protect plants during the very early stages of growth in a plant bed, referred to as PB in FIG. 1.

Plastic type cover 12 functions as a fumigant cover in the plant bed operations and in the preferred embodiment would be of a thickness ranging from one mil to one and one-half mil.

In plant bed preparation and managing, one begins with the fumigation of the plant bed. In this regard, the plant bed PB would be provided with retaining means such as wire spikes or other suitable means such as indicated generally by the numeral 18 that would generally maintain the plant bed cover 10 adjacent the plant bed. Once the fumigating apparatuses are placed within the plant bed PB, the combination fumigation and plant bed cover 10 is drawn over the plant bed and is supported about its outer edge portions by the boundary support structure 18. During the fumigation process, the plastic type cover 12 would serve to contain and confine the gases about the plant bed PB area and would generally prohibit such from escaping to the outside atmosphere. It is to be appreciated that in a preferred embodiment and use of the combination fumigation and plant bed cover 10 of the present invention, that the cover is oriented over the plant bed, as illustrated in FIG. 1 such that the cloth type cover 14 assumes the lower position directly adjacent the plant bed with the plastic type cover 12 assuming a position thereover.

Once plant bed fumigation has been concluded, the combination plant bed cover 10 is then removed from the plant bed and the farmer can then begin preparing the plant bed for seeding. During this phase of plant bed preparation and management, the plant bed is aerated for a selected time after which the farmer may disc and ferilize the plant bed. After this, the seeds are planted in the plant bed.

Once seeding has been accomplished, the combination fumigation and plant bed cover 10 is drawn over the plant bed again. Once drawn over the plant bed, the plastic type cover 12 assumes a top position over cloth type cover 14 that lies adjacent the plant bed. Consequently, after seeding and as the process heads towards germination, the combination plant bed cover of the present invention presents a greenhouse type effect about the plant bed inasmuch as solar radiation may be transferred through the plastic type covering 12 and captured by the plant bed. The net result is that the plant bed environment is maintained in a warmer climate that is more susceptible to seed germination than the outside climate. This is especially appreciated since plant beds are typically planted in late winter prior to spring. Therefore, the combination plant bed cover 10 of the present invention helps expedite seed germination and it is generally thought that the plant bed cover 10 of the present invention could reduce the time required for seed germination up to two weeks, and even possibly more.

Once the farmer observes the plants emerging from the ground, then he simply engages the top plastic cover 12 and tears the same from the cloth cover 14 along the stitched seam perforations 16. In tearing the plastic type cover 12 from the cloth cover 14, the cloth cover 14 stays and remain stretched over the plant bed.

Therefore, after seed germination and the plants have begun to emerge from the ground, then the plant bed is already covered by the presence of the cloth type cover 14. This cloth type cover 14 remains about the plant bed until the farmer determines that such is no longer needed.

From the foregoing specification and description of the basic method of preparing and managing a plant bed with a dual-ply plant bed cover of the character of the present invention, it is appreciated that the combination plant bed cover 10 of the present invention takes the place of two separate and independent covers conventionally used about plant beds from fumigation through plant growth. In addition, the combination plant bed cover 10 of the present invention greatly reduces the labor and effort required in the various covering phases of plant bed management inasmuch as the farmer only has to work with one plant bed cover.

Finally, the basic nature and construction of the combination plant bed cover 10 of the present invention yields another benefit in reducing time required for seed germination. This is accomplished by maintaining the plastic cover 12 over the plant bed after seeding until seed germination occurs. In this same regard, the design and construction of the combination plant bed cover 10 enables the plastic type covering 12 to be easily stripped away from the cloth type plant bed cover 14 without affecting the cloth type that remains in tact to protect the plants from the point of seed germination through early plant growth.

Based on the above, it follows that the combination plant bed cover 10 progresses the state of the art substantially in plant bed covers and method of preparation and management of plant beds.

METHOD OF FORMING AND FABRICATING THE DUAL-PLY FUMIGATION AND PLANT BED COVER

Figure 2:
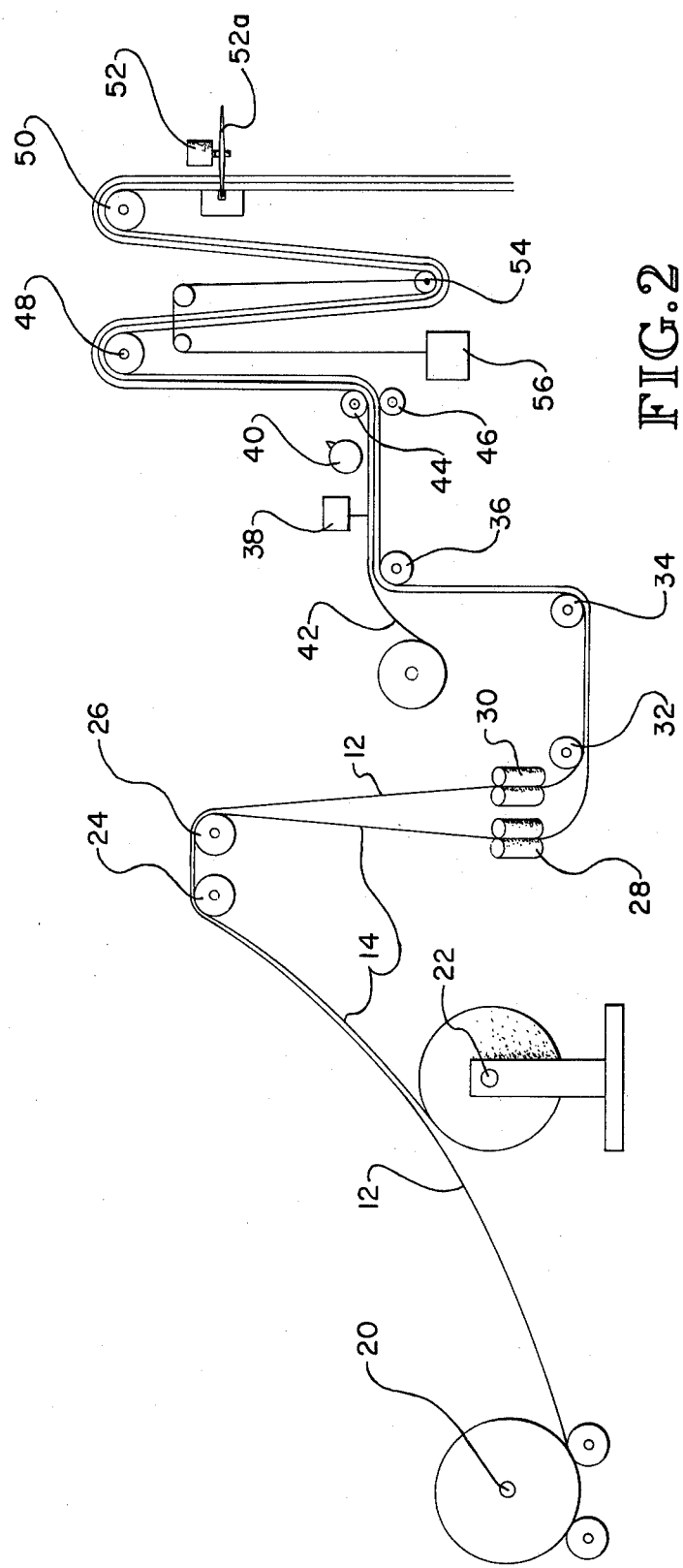
FIG. 2 is a schematic illustration of the method or process for forming and fabricating the dual-ply fumigation and plant bed cover of the present invention.

With reference to FIG. 2, there is shown a schematic illustration of the basic method or process of the present invention for forming and fabricating a certain type or species of the dual-ply fumigation and plant bed cover of the present invention.

With particular reference to FIG. 2, it is seen that there is shown a roll of plastic material 20 from which a plastic sheet or layer 12 is continuously pulled therefrom. Adjacent plastic roll 20 is a cloth roll 22 having the cloth type material, as hereinbefore generally described, unwound therefrom and indicated by the numeral 14, and directed generally under the plastic sheet or layer 12 towards two elevated idlers or guides 24 and 26. It is thusly appreciated that in the process that the respective layers, that is plastic layer 12 assuming a top position and the cloth type layer 14 assuming an underlying bottom position, are both brought relatively close together in back-to-back relationship and pulled simultaneously together over the guides or rollers 24 and 26.

From the idlers 24 and 26, plastic layer 12 and cloth type layer 14 are separated and each side of each layer is directed through an air type centering control device, indicated by the numerals 28 and 30 in FIG. 2. It is to be appreciated that the pair of air centering control guides 28 and 30 would be disposed on opposite sides of the layers 12 and 14 and that opposite sides of each layer would be directed through a respective air type centering guide so as to maintain the plastic layer 12 and cloth type layer 14 in proper alignment. It is to be appreciated that the plastic top layer could be slightly more narrower than the underlying cloth type layer and for purposes of alignment, the air centering guides 28 and 30 would generally maintain the longitudinal center axis of each layer in alignment.

From the air centering control devices 28 and 30 disposed upon each side of the system, the respective layers 12 and 14 are directed underneath and around two idlers or guides 32 and 34 where the two layers are directed around and in engagement with a powered roller 36 which assists in pulling the material from the respective rolls 20 and 22.

As seen in FIG. 2, a second pair of cooperating power rollers 44 and 46 are disposed down stream from power roller 36 and adapted to receive the material therebetween. Between roller 36 and power rollers 44 and 46 there is a stitching station and a hole punching station. More particularly about each side of the layers, there is provided a stitching head 38 of a dual head stitching system, and a hole puncher 40.

Prior to the stitching head 38, a relatively narrow strip of tape cloth 42 is unwound and directed onto each side of the plastic layer 12. Tape cloth strip 42 is aligned with the stitching head 38 and the stitching head is continuously actuated to form a continuous sewn stitch through the tape cloth 42 and onto and through both the plastic layer 12 and cloth type layer 14 to form a continuous stitch along the side of the layers. It is again pointed out that this occurs on both sides of the layers 12 and 14 and relatively close to the respective side edges thereof.

After stitching by the stitching head 38, on each side of the layers 12 and 14, a heated hole puncher engages the coth strip 42 and the underlying layers 12 and 14. The hole puncher device 40 disposed on each side of the layers 12 and 14 acts to form a series of anchoring holes, at selected integrals, through the strip cloth 42 and the underlying layers 12 and 14. It is to be noted that in a preferred design the hole puncher device 40 would be heat actuated such that heat is actually utilized to assist in penetrating and forming the resulting holes. Also, it should be noted that these holes, which could be spaced approximately every 18 inches, can be utilized about the plant bed to appropriately anchor the dual-ply fumigation and plant bed cover therearound.

From the hole punchers 40, the fabricated dual-ply plant bed cover is then pulled through the previously mentioned pair of power rollers 44 and 46 from which the same is directed over two longitudinally spaced power rollers 48 and 50. After exiting power roller 50, the fabricated dual-ply fumigation and plant bed cover is ready to be cut into any selected length desired.

To accommodate this, there is provided a cutting device 52 including a circular blade 52a. Cutting device 52 is of the transverse cutting type and once selectively actuated, is designed to traverse the entire width of the fabricated cover and to cut the same while the powered roller 50 is maintained stationary by a conventional combination clutch and brake arrangement.

During the actuation of the cutter 52 the clutch portion is disengaged and the brake is actuated. This all occurs while the power roller 50 is brought to a stop. Because the preceding portions of the process continue to operate, it follows that the fabricated cover continues to pass over and from the power roller 48.

While the power roller 50 is halted, there is provided a take-up or compensator roller 54 that is suspended through a counterbalancing arrangement and a counterbalance weight 56. Take-up roller or compensator 54 extends transversely across the fabricated cover and the actuation of the brake discussed above results in the take-up roller 54 being suspended in a fashion that it can slowly drift down, engaging the fabricated cover and as the same moves downwardly, to continuously take up the slack in the fabricated cover extending between power roller 48 and halted power roller 50.

Once the cut has been made, the brake is automatically deactuated and the clutch is actuated causing the power roller 50 to begin operation. In the design of the present system, the power roller 50 is designed to turn at a relatively high speed so as to effectively take up the slack in the fabricated cover compensated for by the take-up roller 54. The actuation of the power roller 50 causes the accumulated portion of the fabricated cover lying between the rollers 48 and 50 to be taken up. The take-up roller 54 is preferably housed within a channel structure and as the slack is taken up it follows that the same will move upwardly. The system is designed such that once the take-up roller 54 reaches a certain point it will actuate a switch which will in turn deenergize the power roller 50 so as to control the flow of fabricated cover thereover. Once the fabricated cover begins to accumulate between rollers 48 and 50 and yet the cutting device 52 has not been actuated, the take-up roller 54 will deactuate another switch and cause the power roller 50 to begin turning again. In essence, while the cutting device 52 is not actuated, the power roller 50 will turn on and off in sequence while the take-up roller 54 will oscilate back and forth actuating the same.

In the present disclosure, the cutting device 52 has been described in connection with a transverse circular saw type. It is to be appreciated, however, that the same could include an elongated heated cutting wire that could be brought into selected contact with the fabricated cover by two electromagnets or solenoid switch means, or other suitable means.

After a segment of the cover has been cut, the respective ends of the cut cover can be closed and fabricated by applying the tape cloth strips 42 about the end and directing the same through a sewing machine and puncher such that the ends will conform with the already formed and fabricated sides. The fabrication about the ends can at one's option be done manually without sacrificing efficiency.

It should be noted that there are other suitable means and approaches to securing the plastic cover 12 to the cloth cover 14. One suitable approach would include intermittingly welding the plastic cover 12 to the cloth type cover 14 to form a stitch like securing seam that would enable the plastic cover 12 to be torn from the cloth type cover 14 just as with a thread type stitch discussed hereinabove. There is presently available technology for accomplishing such, including high wave energy devices for intermittingly bonding the plastic cover of the cloth type cover.

Figure 3:
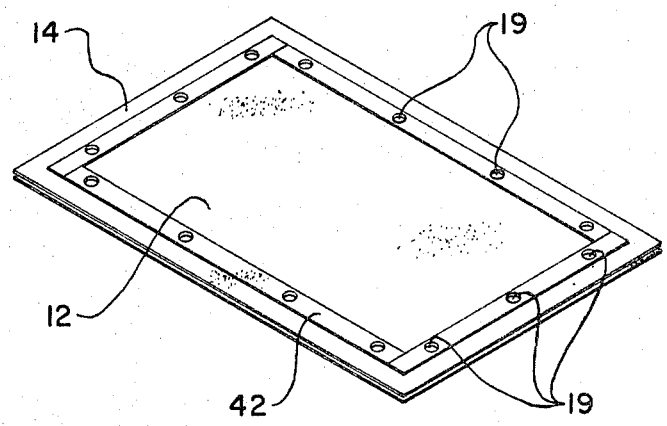
FIG. 3 is a perspective view of a dual-ply cover according to the process illustrated in FIG. 2.

Turning now to the dual-ply fumigation and plant bed cover of the type to be produced by the process just described and illustrated in FIG. 2, it is seen from FIG. 3 that the produced dual-ply cover would have again the same plastic top layer 12 and cloth type layer 14 as already described and discussed hereinbefore with respect to the cover of FIG. 1. In addition, the stitching would be applied through the top tape cloth strip 42. At selected integrals, there would be anchor openings 19 formed in the plant bed cover. It is appreciated that the plastic top layer 12 can be easily stripped away from the lower cloth like layer 14.

From the foregoing specification and discussion, it is seen that the method or process of forming and fabricating the dual-ply fumigation and plwant bed cover of the present invention is designed for efficiency and particularly designed to provide a reliable and durable plant bed cover of the type hereinbefore described. Of principal importance is the

What is claimed is:

1. A method of forming a dual-ply plastic-cloth type plant bed cover, comprising the steps of: pulling a plastic sheet having two side edges from a roll of plastic; pulling a cloth type sheet having two side edges from a roll of cloth; directing the plastic and cloth type sheets together in relatively closed back-to-back relationship and pulling the two sheets together over at least one idler; directing each of the two sheets through centering control means for maintaining the respective sheets in alignment with each other and continuing to pull said sheets through said centering control means; feeding a relatively narrow tape cloth onto both sides of the two sheets; directing the two sheets and tape cloth strips to a dual head stitching system and aligning the tape cloth strip and adjacent plastic and cloth type sheets on one side with one stitching head and aligning the tape cloth strip and adjacent plastic and cloth sheets about the other side with the other stitching head; pulling the tape cloth strips and adjacent plastic and cloth type sheets through said stitching heads; stitching the tape cloth strip and adjacent plastic and cloth sheets together about both sides to form a dual-ply plastic-cloth plant bed cover; punching anchor holes through said tape cloth strips and adjacent plastic and cloth type sheets about both sides of said dual-ply plant bed cover at selective intervals; directing the dual-ply plant bed cover to a cutting device; and cutting the fabricated dual-ply plant bed cover at selected integrals to form a fabricated and finished dual-ply plant bed covers.

2. The method of claim 1 including the step of stopping the movement of the fabricated dual-ply plant bed cover adjacent the position of said cutting device while said cutting device is making a cut; continuing to move the dual-ply plant bed cover through said dual head stitching machine while said cutting device is making said cut; and taking up slack within said dual-ply plant bed cover between said stitching head and said cutting device while said cutting device is making said cut.

3. The method of claim 1 wherein a take-up device engages said fabricated plant bed cover after stitching and wherein the same is operative to move between first and second positions wherein the degree of take-up increases from said first position to said second position; and wherein the method further includes a drive roller disposed adjacent said cutting device for pulling and driving the fabricated plant bed cover passed the area where cuts are made; and wherein the method includes the step of driving said roller at a speed such that the speed of the plant bed cover passing thereover passes at a speed greater than the normal speed that the plant bed cover is pulled through said stitching head for a selected toime such that portions of the plant bed cover taken up by said take-up device can be directed passt the cutting device such that through continuous operation there is not an undue accumulation of plant bed cover between the cutting device and stitching heads.

4. The method of claim 3 wherein the step of forming anchoring holes in said dual-ply plant bed cover includes forming the openings by engaging the dual-ply plant bed cover with a heated penetrating member wherein the heat therefrom aids in actually forming the openings.

* * * * *